Nov. 23, 1965  E. R. SCHUMANN ETAL  3,219,063
VALVE WITH INCREASED FLOW AREA
Filed May 14, 1963  2 Sheets-Sheet 2

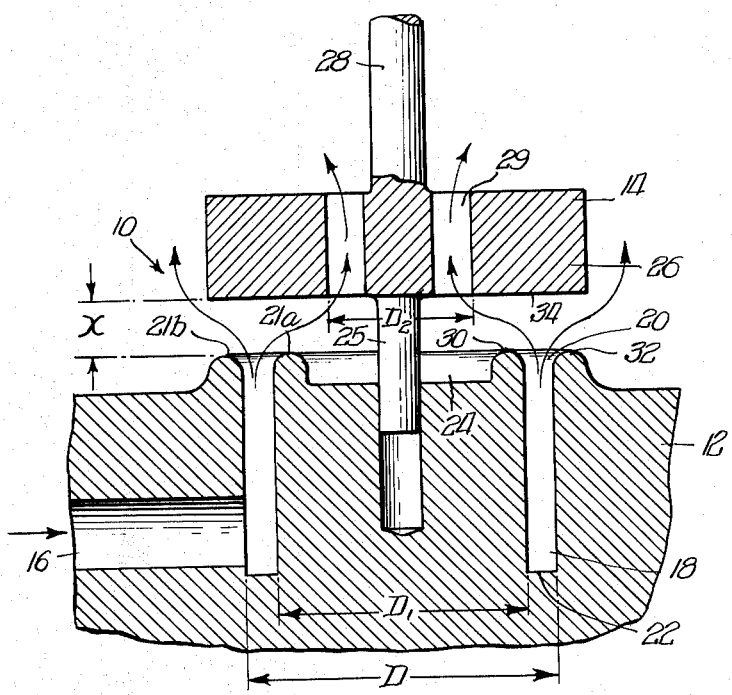
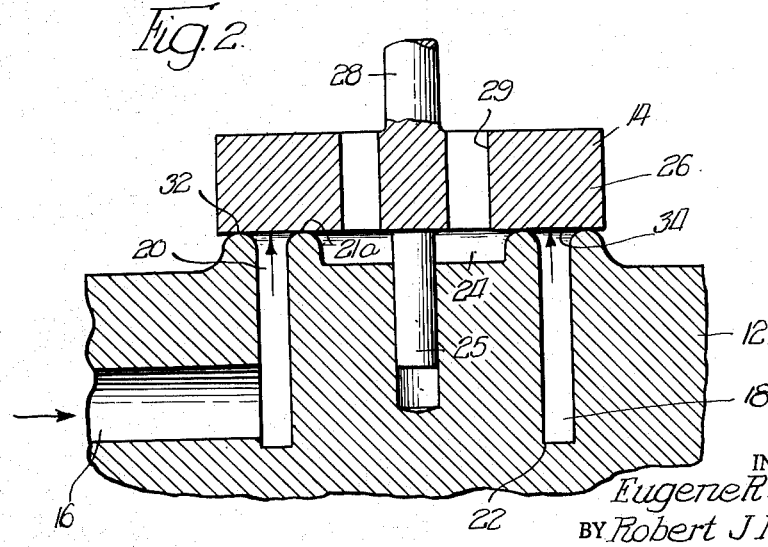

INVENTORS
Eugene R. Schumann,
BY Robert J. Norman
Byron, Hume, Groen + Clement
ATTYS 3,219,063
VALVE WITH INCREASED FLOW AREA
Eugene R. Schumann, Franklin Park, and Robert J. Norman, Chicago, Ill., assignors to The Powers Regulator Company, Skokie, Ill., a corporation of Illinois
Filed May 14, 1963, Ser. No. 280,268
4 Claims. (Cl. 137—625.33)

This invention pertains to a valve mechanism and particularly to an improvement for reducing the pressure forces that are normally exerted upon the moveable portion of the valve by the fluid flowing therethrough.

This invention is particularly adapted to be utilized in conjunction with valves when the position of the valve must be accurately controlled. One such instance occurs in systems where the valve is controlled by means of a signal generated in response to the flow therethrough or by some variable affected by the flow. The signal may take the form of a pneumatic, hydraulic or electrical force which is imposed upon the moveable portion of the valve by a suitable generating means. Generally, it is desirable to minimize the force required to operate the valve and to maintain it in a given position to the greatest extent possible. This in turn minimizes the magnitude of the signal generating equipment.

It is well known that the moveable portion of a valve is normally subjected to a static force exerted by the pressure of the fluid media flowing through the valve. This force tends to force the moveable valve member out of engagement with the valve seat member. As a result, such force represents an error inducing factor which is obviously undesirable.

The subject invention represents an improvement whereby the flow area for a given position of the moveable valve member may be substantially increased and at the same time the total force on the valve is substantially reduced. The results of such arrangement are two-fold. Firstly, the amount of force necessary to counteract that exerted upon the valve member is substantially reduced. This in turn decreases the error inducing tendencies of the force exerted by the fluid media. Secondly, the amount of flow for a given opening of the moveable valve member is substantially increased.

The invention may be briefly described as comprising a valve seat member adapted to be connected to a source of fluid media. A valve member moves in and out of engagement with said valve seat member for controlling the flow through the valve seat member. The valve seat member includes an annular groove having seating surfaces extending around the peripheries thereof at one end, and a port communicating with said annular groove. The valve member includes an annular member moveable in and out of engagement with the seating surfaces. When in seating engagement, the annular member overlies the annular groove and the seating surfaces adjacent the inner and outer peripheries thereof at the one end so as to prevent flow from the groove. When the valve member is out of engagement with the seating surface the fluid media flows from the annular groove around the outer and inner peripheries of the annuar member.

A foremost feature and object of the invention resides in the provision of a valve mechanism in which the force exerted by the pressure of the fluid media upon the moveable valve member is substantially reduced.

A further object of the invention resides in the provision of a valve mechanism in which the force required to position the moveable valve member with respect to the valve seat is substantially reduced.

A further object of the invention resides in the provision of a valve mechanism in which the flow area for any given position of the moveable valve member is substantially increased.

A still further object of the invention resides in the provision of a novel valve mechanism of a simple and economical construction.

These and other features and objects of the invention will be apparent upon reading of the specification with reference to the following drawing.

In the drawing:

FIGURES 1 and 2 are schematic views of the invention;

Figure 4:
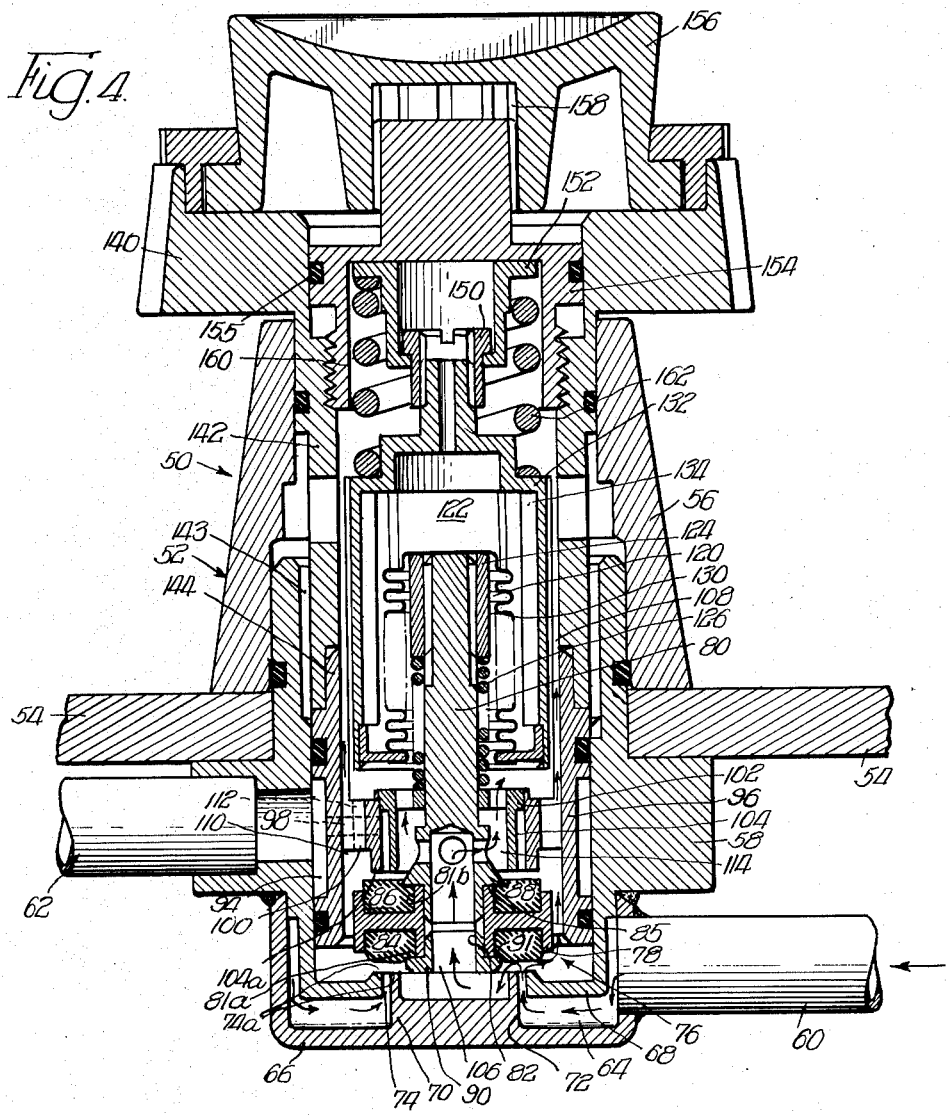
FIGURE 4 is a sectional view of a valve embodying the invention.

Referring now to the drawings, there is shown a schematic illustration of the invention. It is to be understood that the illustrations in the drawings are not to be considered as limiting but are exemplary of the invention and that it may take various physical forms. The various components utilized in the invention may be constructed to any suitable dimension and of any material having properties permiting it to function in the manner intended.

Referring to FIGURE 1, the invention comprises a valve assembly generally denoted by the numeral 10. The valve assembly includes a valve seat member 12 and a moveable valve member 14. The latter for purposes of convenience will sometimes hereinafter be referred to as a poppet.

The valve seat member comprises an inlet which is adapted to be connected to a suitable source of the fluid media controlled by the valve. In most instances a valve will include an outlet port although the latter does not form a part of the invention. The inlet port 16 communicates with an annular groove 18 disclosed within the body of the valve seat. The groove 18 is open at one end 20 and closed at the other end 22. Thus the fluid media flowing through the inlet port enters the annular groove 18 and distributes itself therearound and then flows upwardly out the open end 20.

The valve seat 12 is further provided with the seating surfaces 21a and 21b adjacent the inner and outer peripheries of the annular groove 18, respectively. The seating surfaces 21a and 21b are adapted to be engaged by the poppet as will be explained later on. Concentric with the annular groove 18 is the cavity 24. The cavity 24 is not an essential part of the invention but may be used for facilitating alignment of the poppet with the valve seat. Specifically, the poppet may be provided with element 25 which extends into the counter bored portion 24a of the cavity 24. The cavity 24 further facilitates the provision of seating surfaces adjacent the annular groove 18.

The poppet 14 in its simplest form comprises a disk 26 and some means such as a centrally mounted stem 28 for movement of the former. The stem 28 is adapted to be connected to any suitably actuated mechanism such as a pressure operated diaphram or bellows or even a manually operated wheel or lever. The disk 26 is of a diameter materially greater than the outside diameter of the annular groove 18 and is adapted to overlie the seating surface 21a. The disk 26 is provided with the aperture 29 adjacent its center. The aperture 29 may comprise an annular groove which is substantially uninterrupted. The only interruption would be the means for connecting the stem 28 to the disk 26 such as one or more radially extending arms. The passage means may also take the form of a series of closely spaced apertures arranged in an annular fashion about the stem. It is generally desirable that the passage means 29 have a maximum amount of cross sectional area that will permit free flow therethrough and at the same time permit mechanical connection of the stem 28 to the disk 26.

As stated previously, the disk 26 is adapted to overlie the annular groove 18 and the seating surfaces 21a and 21b.

The face 34 of the poppet 26 is adapted to seat on the surfaces 21a and 21b when the poppet is in its closed position as shown in FIGURE 2. When this happens, the valve is closed so that the fluid cannot escape from the annular groove 18. When the valve is in the open position as shown in FIGURE 1 the fluid flows from the annular groove 18 as indicated by the arrows. Specifically, the fluid flows outwardly around the periphery of the poppet and inwardly through the passage 29. This is in contrast to the ordinary poppet valve construction in which the fluid can flow only in an outward direction and around the periphery, as shown in FIGURE 3.

This arrangement, as stated previously, has several significant advantages over the conventional poppet valve construction. One of the more important advantages is the reduction of the static force exerted by the fluid flowing through the valve. In a conventional poppet valve the total force, $F_a$, exerted on the valve by the fluid pressure is equal to the area of the aperture in the valve seat times the pressure of the fluid. Thus the force $F_a = \pi D^2/4 P_s$. The flow area, $A_F$, for any given opening of the poppet is equal to $\pi DX$ where X is the gap between the valve seat and the poppet.

Referring now to a FIGURE 1 it can be seen that the force $F_a$ is equal to $\pi/4(D^2 - D_1^2)P_s$. $D_1$ is the internal diameter of the annular groove 18. It can be seen that the total force in FIGURE 2 is substantially less than in FIGURE 3. The amount, of course, is dependent upon the relationship between $D_1$ and D. The flow area in FIGURE 2 is equal to $\pi DX$ plus $\pi D_2 X$. As $D_2$ approaches D then the flow area approaches $2\pi DX$. It can be seen from the above that there is a substantial gain in the total flow area and a substantial reduction of force exerted by the fluid on the poppet valve. The reduction in force, in turn, reduces the force necessary to drive the poppet in and out of seating engagement with the valve seat.

Figure 3:
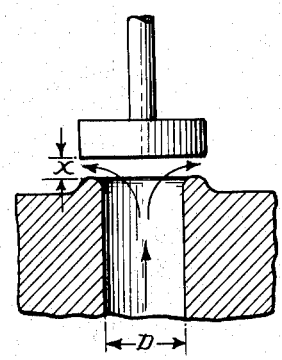
FIGURE 3 is a schematic view of a prior art valve.

It is recognized that the total capacity of the flow passage in the valve seat in FIGURE 2 is somewhat less than the construction shown in FIGURE 3 where the diameters are the same. Generally, valves in which the proposed invention is to be used are limited to a range substantially less than their total capacity, particularly since the poppet valve at its maximum displacement may be no more than several thousandths of an inch from the seating surface. Thus the restriction lies between the poppet and the seating surface and not in the passage through the valve seat. For this reason the diminution in capacity in invention is used. It will be noted that the mixing valve is the valve seat is not considered material.

Referring now to FIGURE 4, there is shown a sectional view of a mixing valve 50 in which the subject invention is used. It wil be noted that the mixing valve is the subject of a co-pending application filed in the name of Robert J. Norman on May 7, 1963, assigned Serial No. 278,546. The portions of the valve other than the seat and the moveable valve mechanism will be described only briefly hereinafter. For a more detailed description, reference should be made to the aforementioned co-pending application.

The valve includes a casing assembly 52 which may be received in a sink top as indicated by the fragmentary portions 54. The sink top 54 is received between the upper half 56 and the lower half 58 for purposes of mounting the valve 50.

The lower half 58 of the casing includes a hot water port 60 and a cold water port 62. The mixed water is exhausted through a port mounted on the upper half 56 of the casing but is not shown due to the fact that it is at right angles to the section shown in the drawing. The exhaust port may take the form of a faucet nozzle as would normally be found on a lavatory.

The hot water is conducted through the port 60 into the annular chamber 64. The chamber 64 is defined by the base 66 and the flanged section 68 extending from the lower half of the casing 58. The inner periphery of the annular chamber 64 is defined by the pedestal 70 which is of a cylindrical shape and lies along the center line of the casing. The flange 68 terminates short of the pedestal wall 72 so as to define the annular passage 74.

The flow through the passage 74 is controlled by means of the poppet assembly 76 which will be described hereafter. When the poppet assembly is in its unseated position, the hot water entering through the port 60 flows through the annular chamber 64 and out the passage 74.

The poppet assembly 76 comprises the disk 78 having the cavities 81a and 81b. Rings of resilient material 84 and 86 are received within the cavities 81a and 81b respectively. The ring 84 overlies the passage 74 and is adapted to seat on the surfaces 74a adjacent the passage 74. The disk 78 is mounted on the stem 80 by a press fit. Specifically, a portion of the stem 80 is received within the aperture 82 and is adapted to abut against the shoulder 85. The shoulder 85 further abuts the ring 86 so as to secure the latter in the cavity 81b. An end cap 90 is pressed into the aperture 82 and by means of a shoulder 91 affixes the ring 84 within the cavity 81a.

The cold water enters the port 62 into an annular chamber 94 extending around the lower half of the casing 58. The chamber 94 is defined by the sleeve 96 which is received within the casing 58. The sleeve 96 is provided with sealing means adjacent the upper and lower extremities of the chamber 94.

The chamber 94 extends by means of a plurality of spaced passages 98 which extend through the wall of the sleeve 96 and an annular flange 100 extending inwardly from the sleeve. A sleeve 102 cooperates with the flange 100 to form the annular groove 104. The groove 104 is open at one end so that fluid may flow therefrom.

The fluid from the port 62 flows into the annular chamber 94 through the annularly spaced passages 98 and into the groove 104. The poppet disk 78 and specifically the ring 86 overlie the groove 104 and control the flow therefrom. When the ring 86 is in seating engagement with the surfaces 104a adjacent the peripheries of the groove 104, the flow is blocked. As the poppet is opened the flow is resumed.

It will be noted that the valve stem 80 is provided with the bore 106 which terminates with the passages 107. Thus when the poppet 76 is in its open position with respect to the annular groove 74 the water flows around the periphery of the poppet through the space defined by it and the sleeve 96 and into the space 108 which leads to the exhaust port (not shown). The water also flows toward the center of the poppet and upward through the bore 106 and out through the radial passages 108. From the radial passages 107 the water mixes with the cold water as will be seen hereinafter and flows through the center of the ring 102 and then outward until it reaches the passage 108.

When the poppet 76 is spaced from the cold water passage 104 the cold water flows outwardly toward the periphery of the poppet 76 so as to mix with the hot water in the space 110. The mixed water flows through a plurality of passages 112 spaced around the annular flange 100 and intermediate the passages 98. From the passages 112 the mixed water flows into the space 108 to the outward port. The cold water also flows toward the center of the poppet into the space 114 intermediate the ring 102 and the stem 80. Thus the cold water, like the hot water, flows both around the outside of the poppet and toward the center of the poppet.

As explained previously this arrangement directly results in a substantial diminution of the force exerted on the poppet. Thus the force required to position the poppet for any given rate of flow is substantially reduced.

Furthermore, as a result of the increased flow area the rate of flow for a given opening is substantially increased.

The remainder of the valve and the operation will now be briefly described. This portion of the valve forms no part of the invention other than the environment in which it is used.

The upper end of the stem 80 is received within the cavity 120 defined by the bellows assembly 122. The stem is provided with a cap 124 on which abuts the coil spring 126. The spring 126 biases the stem into engagement with the bellows assembly 122.

The bellows assembly 122 comprises the convoluted wall 130 and the annular casing 132 which define the space 134. The bellows 122, particularly the space 134, is filled with a thermally expansive fluid such as a gas or a liquid such as ether. The mixed water from the cold and hot water ports is brought into contact with the bellows when it flows through the space 108 and also into the cavity 120. Should the temperature of the mixed water increase, the thermally expansive fluid expands in volume so as to compress the convoluted wall 130. Such compression drives the stem 80 and in turn the poppet disk 78 downward toward seating position with the hot water so as to diminish the flow of hot water. This in turn reduces the flow so as to cause the mixed water temperature to return to the desired level. Conversely, if the temperature of the mixed water should decrease the expansible fluid volume would decrease so that the convoluted wall 130 will expand. The spring 126 will force the stem 80 and in turn the poppet disk 78 upward toward seating position with the cold water outlet. In this way, the temperature of the mixed water is regulated to some pre-selected level regardless of variations in the line pressure or temperature of either the hot or cold water.

The volume is regulated by means of the knob 140. The knob 140 includes the sleeve 142 which is received within the casing 56. The sleeve 142 is secured to the sleeve member 96 and in fact they may be integral. The sleeve member 142 engages the lower half of the casing 58 by means of the threads 143 so that rotation of the knob 140 causes longitudinal movement of the sleeve 142 and in turn the sleeve 96. The movement of the sleeve 96 causes displacement of the cold water seat 104 with respect to the poppet disk. If the poppet disk were to remain stationary, continued movement of the cold water seat by rotation of the knob 140 in the off direction would bring them into seating engagement. As will be seen hereinafter, the poppet disk does not remain stationary when the knob 140 is rotated toward the off position but moves at the same time toward seating position with the hot water seat. Thus the flow rate from both the hot and cold water ports will diminish correspondingly until they are both shut off.

The bellows assembly 122 and particularly the casing 132 is provided with a cap 150 at its upper end. The cap in turn is connected by the cup 152 to the sleeve 154. The sleeve 154 is connected to the temperature control knob 156 by any suitable means such as the spline 158. The sleeve 154 is in turn connected to the sleeve 142 by means of the threads 160. When the knob 156 is rotated the sleeve 142 remains stationary because of the frictional drag exerted by the sealing ring 155. Rotation of the knob 156 and in turn the sleeve 154 relative to the sleeve 142 causes a longitudinal shift of the sleeve 154 as a result of the threads 160.

A coil spring 162 biases the bellows assembly 122 downwardly so that there is engagement between the cap 150 and the cap-shaped member 152. Thus movement of the sleeve 154 causes like movement of the bellows assembly 122 relative to the sleeve 142. The movement of the bellows assembly 122 in turn causes like movement of the valve stem 80 and the poppet disk 78. Such longitudinal movement adjusts the position of the poppet disk 78 relative to both the hot and cold water seats when in the open position. In this manner the ratio flow from the hot and cold seats may be varied so that the temperature of the mixed water may be pre-selected. The knob 156 is provided with a suitable indicating means and indicia (not shown) for facilitating a desired mixed water temperature.

After the aprpopriate temperature has been selected, the control knob 140 is then opened to the desired extent. Rotation of the control knob 140 causes longitudinal movement of the sleeve 142 as explained previously and also the sleeve 154 in the same direction. Assuming that the valve is in the closed position and the knob is being rotated toward on position both the sleeve 142 and the sleeve 154 will be moved upwardly. The upward movement of the sleeve 142 increases the distance between the cold water seat 104 and the hot water seat 74a. When this happens the poppet disk 78 will be disengaged from one or both seats depending on the temperature setting of the knob 156.

Conversely, rotation of the knob 140 in the opposite direction causes downward movement of the cold water seat 104 so as to diminish the gap between it and the hot water seat 74. This in turn diminishes the total flow from the valve. The poppet 76 may or may not be moved downwardly depending upon the setting of the temperature adjusting knob 156. When the knob 140 has been rotated to the off position, both the cold water seat 104a and the hot water seat 74 will be in a seating engagement with the poppet disk 78.

For a more detailed explanation of the operation of the valve, reference should be made to the aforementioned co-pending application.

As explained previously, the subject invention provides a substantial diminution in the pressure exerted upon the poppet valve. This, in turn, reduces the force required for the positioning of the poppet. The invention further provides an increased flow area so as to increase the volume for a given gap between the poppet and the seats. Although certain specific constructions have been described, it is to be understood that these are exemplary and are not to be considered as limitations except as claimed hereafter. It will be apparent that certain modifications may be made within the scope of the appended claims without departing from the spirit of the invention.

We claim:

1. A valve mechanism comprising a valve seat member adapted to be connected to a source of fluid media to be controlled by said valve mechanism, an annular valve member for controlling the flow through said valve seat member, said annular valve member having an inner and an outer periphery, with said inner periphery defining an aperture therein, said valve seat member including two portions which cooperate to define an annular groove which is open at one end and closed at the other end and is unobstructed from said closed end to said open end, said two portions joining to form said closed end of said annular groove, an annular seating surface on an end of one of said two portions extending adjacent the inner periphery of said annular groove, the part of the seat member enclosed by the annular seating surface on said one of said two portions being impervious to flow, an annular seating surface on an end of the other of said two portions extending adjacent the outer periphery of said annular groove, and a port communicating with said annular groove through a side wall thereof and intermediate said open and closed ends of said annular groove, said valve member adapted to overlie said annular groove and said annular seating surfaces, whereby when said valve member is out of engagement with said seating surface said fluid metdia flows through said port into said annular groove and from said annular groove and around the outer periphery and through said aperture of said annular valve member.

2. A valve mechanism comprising a valve seat member adapted to be connected to a source of fluid media to be controlled by said valve mechanism, a valve member for controlling the flow through said valve seat member, said valve seat member including first and second portions which cooperate to define an annular groove which is open at one end and closed at the other end and is unobstructed from said closed end to said open end, said first and second portions joining to form said closed end of said annular groove, an annular seating surface on an end of said first portion extending adjacent the inner periphery of said annular groove, the part of the seat member enclosed by the annular seating surface on said one of said two portions being impervious to flow, an annular seating surface on an end of said second portion extending adjacent the outer periphery of said annular groove, and a port communicating with said annular groove through a side wall thereof and intermediate said open and closed ends of said annular groove, said valve member including an annular member movable in and out of engagement with said seating surfaces to control the flow from said valve seat member, said annular member having an outer periphery and an inner periphery defining an aperture therein, said annular member when in seating position adapted to overlie said seating surfaces and said annular groove for preventing flow therefrom, whereby when said annular member is out of engagement with said seating surface, said fluid media flows through said port into said annular groove and from said annular groove and around the outer periphery of said annular member and through said aperture.

3. A valve mechanism comprising a valve seat member adapted to be connected to a source of fluid media to be controlled by said valve mechanism, a valve member for controlling the flow through said valve seat member, said valve seat member including first and second portions which cooperate to define an annular groove which is open at one end and closed at the other end and is unobstructed from said closed end to said open end, said first and second portions joining to define the closed end of said annular groove, an annular seating surface on an end of said first portion extending adjacent the inner periphery of said annular groove at the open end thereof, the part of the seat member enclosed by the annular seating surface on said one of said two portions being impervious to flow, an annular seating surface on an end of said second portion extending adjacent the outer periphery of said annular groove at the open end thereof, said annular seating surfaces lying in a plane substantially perpendicular to the axis of said annular groove, and a port communicating with said annular groove through a side wall thereof and intermediate said open and closed ends of said annular groove, said valve member including an annular member moveable in a direction substantially parallel with the axis of said annular groove in and out of seating engagement with said seating surface to control the flow therefrom, said annular member having an inner periphery defining an aperture therein and an outer periphery and when in seating engagement with said valve seat member overlying said annular groove and said seating surfaces, whereby when said annular member is out of engagement with said seating surfaces said fluid media flows through said port into said annular groove and from said annular groove and around the outer periphery and through said aperture of said annular valve member.

4. A valve mechanism comprising a valve seat member adapted to be connected to a source of fluid media to be controlled by said valve mechanism, a valve member for controlling the flow through said valve seat member, said valve seat member including first and second portions which cooperate to define an annular groove which is open at one end and closed at the other end and is unobstructed from said closed end to said open end, said first and second portions joining to form the closed end of said annular groove, an annular seating surface on one end of said first annular portion extending adjacent the inner periphery of said annular groove at the open end thereof, the part of the seat member enclosed by the annular seating surface on said one of said two portions being impervious to flow, and an annular seating surface on one end of said second annular portion extending adjacent the outer periphery of said annular groove at the open end thereof, said annular seating surfaces lying in a plane substantially perpendicular to the axis of said annular groove, a port communicating with said annular groove through a side wall thereof and intermediate said open and closed ends of said annular groove, said port being adapted to be connected to said source, said valve member including an annular member movable in a direction substantailly parallel with the axis of said annular groove in and out of seating engagement with said seating surfaces to control the flow from said annular groove, said annular member having inner and other peripheries with said inner periphery defining an aperture therein and when in seating engagement with said valve seat member overlying said annular groove and said seating surfaces so as to block the flow therefrom, and means for moving said movable valve member in and out of seating engagement, whereby when said valve member is out of seating engagement with said seating surfaces said fluid media flows through said port into said annular groove and from said annular groove and around said outer periphery and through said aperture of said annular valve member.

References Cited by the Examiner
UNITED STATES PATENTS

| 765,925 | 7/1904 | Bartel | 137—625.33 X |
| 2,771,248 | 11/1956 | Ehlke | 137—625.33 X |
| 2,928,413 | 3/1960 | Hanson | 137—493.9 |
| 3,055,629 | 9/1962 | Jurs et al. | 251—333 |

FOREIGN PATENTS

| 12,875 | 1849 | Great Britain. |

M. CARY NELSON, *Primary Examiner.*

UNITED STATES PATENT OFFICE
CERTIFICATE OF CORRECTION

Patent No. 3,219,063 November 23, 1965

Eugene R. Schumann et al.

It is hereby certified that error appears in the above numbered patent requiring correction and that the said Letters Patent should read as corrected below.

Column 1, line 59, for "annuar" read -- annular --; column 3, line 51, strike out "vention is used. It will be noted that the mixing valve is"; line 55, for "wil" read -- will --; column 6, line 70, for "metdia" read -- media --.

Signed and sealed this 27th day of September 1966.

(SEAL)
Attest:

ERNEST W. SWIDER
Attesting Officer

EDWARD J. BRENNER
Commissioner of Patents